United States Patent
Mohtat et al.

(10) Patent No.: US 6,782,152 B2
(45) Date of Patent: Aug. 24, 2004

(54) METHOD AND APPARATUS FOR FREQUENCY TUNING OF AN UNBALANCED MACH-ZEHNDER INTERFEROMETER

(75) Inventors: Nadereh Mohtat, Ottawa (CA); Hanwu Hu, Ottawa (CA); Nima Ahmadvand, Ottawa (CA)

(73) Assignee: Peleton Photonic Systems Inc., Ottawa (CA)

( * ) Notice: Subject to any disclaimer, the term of this patent is extended or adjusted under 35 U.S.C. 154(b) by 0 days.

(21) Appl. No.: 09/983,661

(22) Filed: Oct. 25, 2001

(65) Prior Publication Data

US 2002/0076131 A1 Jun. 20, 2002

(30) Foreign Application Priority Data

Oct. 25, 2000 (CA) .............................. 2324419

(51) Int. Cl.[7] .............................................. G02B 6/26
(52) U.S. Cl. .............................. 385/15; 385/27; 385/39; 385/42; 385/50
(58) Field of Search ............................... 385/15, 27, 39, 385/42, 50

(56) References Cited

U.S. PATENT DOCUMENTS 5,903,690 A * 5/1999 Starodubov et al. ......... 385/37
6,192,712 B1 * 2/2001 Saito et al. .................... 65/386
6,201,909 B1 * 3/2001 Kewitsch et al. ............. 385/37
6,385,217 B1 * 5/2002 Singh et al. ................... 372/20
6,400,870 B1 * 6/2002 Hill et al. ...................... 385/39
6,684,013 B2 * 1/2004 Seki et al. ..................... 385/50

FOREIGN PATENT DOCUMENTS

JP          09-258151      *  3/1997    ........... G02F/1/035

* cited by examiner

Primary Examiner—Hemang Sangkavi
Assistant Examiner—Scott Alan Knauss
(74) Attorney, Agent, or Firm—Katten Muchin Zavis Rosenman

(57) ABSTRACT

The present invention introduces a novel and simple method to adjust the MZ filter channels to those of the ITU grid. This is done through inducing an optical path length difference by using a UV light source to create a change in the index of refraction of the fiber arms after the device is packaged. The UV light is launched into the MZI filter through one of its input ports in order to achieve the phase adjustment. Since the exposure length is the entire length of one of the arms of the MZI, the required refractive index change is much smaller than the localized UV tuning of the previous methods. This allows for a weaker UV source power and shorter treatment times, thus reducing the chances of localized fiber damage.

7 Claims, 2 Drawing Sheets

METHOD AND APPARATUS FOR FREQUENCY TUNING OF AN UNBALANCED MACH-ZEHNDER INTERFEROMETER

FIELD OF INVENTION

This invention relates to method and apparatus for tuning the channels of an unbalanced Mach-Zehnder filter to the grids outlined by the International Telecommunication Union (ITU) standards and for the filter channel spacing adjustments by means of an ultraviolet (UV) laser.

BACKGROUND OF THE INVENTION

Wavelength division multiplexing (WDM) devices are used in optical communication systems to carry a number of channels in parallel to its maximum capacity. A number of different technologies exist for WDM components, including thin-film dielectric (interference) filters, planar arrayed waveguides, fiber Bragg gratings, diffraction gratings, and fused-cascaded Mach-Zehnder interferometers (MZI). To meet with the large bandwidth demand, the number of channels are increasing, thus decreasing the spacing between two adjacent channels. Using the Mach-Zehnder technology, channel spacing as narrow as 0.04 nm (2.5 GHz) can easily be fabricated. This spacing theoretically allows for 1600 channels in the C-band region. Furthermore, insertion loss and uniformity is very these components as they are fabricated from standard single-mode silica fiber. The MZI is an odd and even-numbered filter or interleaver. For example a 100 GHz filter results in two periodic sets of WDM channels, one carrying the odd-numbered channels and the other carrying the even-numbered channels. The channels of each of the two sets of channels thus operate with 200 GHz channel spacing.

An asymmetric Mach-Zehnder interferometer (MZI) device comprises two 3 dB couplers with two fibers, $F_1$ and $F_2$, with different optical path lengths in between. The couplers are arranged to transfer half of the optical power centered at 1550 nm along each fiber. Thus, the first coupler splits the input signal into two equal parts sending it to the two optical fibers interconnecting the two couplers. The different optical length of fibers, $F_1$ and $F_2$, leads to a phase delay between the two signals observed from the input ports of the second coupler. It is the difference between the two optical path lengths that determines the channel spacing of the sinusoidal wavelength response of the MZI. The resulting filter has two input and two output ports. These devices are used as wavelength selective devices in optical communication systems and can be used as optical interleavers.

In practical communication systems, the actual channel frequencies of the interleaver should match those of the International Telecommunication Union (ITU) grids that are standards that must be met by all optical interfaces for multi-channel systems. Usually after building MZI the wavelengths do not perfectly match that of the ITU grid and there is a need for further adjustment of the optical phase delays to move the wavelength peaks towards the predetermined locations or even to adjust the wavelength spacing of the filter by altering the optical path length. One way of adjusting the phase delay is to adjust the optical path lengths by exposing the fiber to a UV light so that the refractive index of the optical path is altered to achieve the desired phase delay. In the literature, UV tuning have been introduced for optical phase adjustments by exposing the fiber to a UV light by directing and focusing the UV on the desired location of the fiber surface. This conventional method needs careful operators and a complex optical setup to ensure that the desired fiber length is exposed to the UV source for achieving the desired wavelength shift (see FIG. 1). In order to achieve the required phase adjustments, the UV light has to be fairly intense as well to reach to the core of the fiber through the polymer coating and cladding and to introduce a large enough refractive index change in a limited exposed area of the fiber. That might cause a permanent damage to that location and increase the optical loss in the MZI. In addition, in the previous arts the particulars of the UV exposure for UV tuning of optical devices are not discussed in detail.

Another major challenge in manufacturing of these filters is to make them environmentally robust, so that the wavelength response becomes stable against temperature variations and mechanical vibrations. As a result, tuning of the filter before its packaging is not very helpful because the optical phase delay can be arbitrarily changed due to local stresses or curves or the like on the fiber arms during the packaging process. These changes will in turn lead to possible unwanted changes in the location of the adjusted wavelengths. Therefore it is best to align the channels after the device has been stabilized for vibration and environmental conditions by an initial packaging. However the initial packaging has to insure that at least one section of the fiber in the MZI is exposed to the outside in order to shine the UV light on that section of the fiber. Alternatively, one can use a UV-transparent material on that section of the fiber. However, the UV-transparent material with the required characteristics may not be easily available or suitable for packaging. Furthermore both methods increase the complexity of packaging.

In this patent, we introduce a novel and simple method for adjusting the MZI interleaver channels to those of the ITU grid using a UV light source to create a change in the index of refraction (IOR) of the fiber arms of MZI filter after the device is packaged. Using this method of UV light irradiation of a silica fiber, it is possible to create or adjust a phase delay in a MZ filter by changing its optical path length difference through changing the fiber's index of refraction. In this invention, we launch the UV light into the MZI through one of its input ports in order to achieve the phase adjustment. Note that our irradiation method works from within the fiber, along its whole length, rather than on a localized section of the fiber's exterior surface. In this way, since the exposure length is the entire length of one of the arms of the MZI, the required refractive index change is much smaller than that of the localized UV tuning method and, therefore, the UV source power and duration of irradiation can be lower than the previous methods. Using a weaker UV source and shorter exposure time reduces the chances of damaging the fiber and the MZI. The reason for the success of this method is that the UV light stays in only one of the arms of the MZI. The coupler has a 50:50 coupling ratio at 1550 nm wavelength light source, however it shows negligible coupling ratio at the wavelength of the UV source. Therefore this method allows for selective UV tuning and changing the optical path length of one of the optical arms of the MZ device. Note that an angled output end or an index matching oil at the output end prevents the formation of unwanted grating in the treated fiber arm.

One major consideration for a MZ periodic filter is to minimize the descrepancy between the actual central frequency of the filter channels and the nominal central frequency of the ITU grid. It is known that the UV radiation of a doped-silica fiber causes a change in its refractive index.

This property has been widely used for making index gratings on the fiber. For example in the U.S. Pat. No. 4,807,950, the UV light has been used to create a change in the IOR of Germanium (Ge)-doped silica fiber by aligning two UV beams to the surface of the fiber at a particular angle to imprint a grating. Yet in another invention (U.S. Pat. No. 4,474,427), index grating has been written on optical fiber by launching the visible light into the fiber core. A refractive index grating is formed when the reflected light from the other fiber end interferes with the forward propagation forming a standing wave having a period corresponding to half of the wavelength of the visible light. The UV light has also been used before for UV tuning a MZI device and a coupler. However, in both inventions the surface of the optical fiber or the coupler is subjected to the UV light at a specified angle. In the U.S. Pat. No. 6,031,948, part of the surface of one of the fiber arms comprising the MZI device is shun by a UV source between 150–300 nm to control the pass band wavelength. As another example in the U.S. Pat. No. 5,652,819, the coupling region of a coupler is directly subjected to the UV light in order to control the desired channel spacing.

Usually after a MZI having specific channel spacing is built, there might still be a need for further adjustment of the optical phase delays to move the wavelength peaks towards the predetermined locations of the ITU grids. Furthermore, the wavelength spacing of the filter might need to be altered slightly by fine-tuning the optical path length difference between the two arms. A common way of adjusting the phase delay of a MZ filter is to expose the silica fiber to a UV light source so that the refractive index of the optical fiber is changed to yield the desired phase delay or optical path length difference. The UV tuning methods have been introduced in the literature for optical phase adjustments by exposing the fiber to a UV light by directing and focusing the UV onto the desired surface length of the fiber. This method needs a complex optical setup and delicate operation. The fiber length to be UV treated needs to be carefully calculated and isolated so that the rest of the fiber is not exposed to the UV source. In order to obtain the required phase adjustments the UV light has to be fairly intense to reach to the core of the fiber and introduce a large enough refractive index change in the limited exposed part of the fiber. However, the local UV treatment might cause a permanent damage to that fiber section or increase the optical loss in the MZI. Furthermore in the previous arts, the particular details of the UV tuning method are not discussed.

SUMMARY OF THE INVENTION

The present invention describes a method for the alignment of the channels of an MZI periodic filter to the ITU grid by changing the index of refraction (IOR) of the optical fiber arms of the MZI device using ultraviolet (UV) radiation. By exposing the germanium (Ge)-doped silica fiber to UV light, its IOR can be permanently changed. The change in the IOR of the fiber in turn causes a change in the center wavelength of the device pass band. By sending the UV light into one of the device inputs, the UV will affect only one of the optical arms interconnecting the two couplers. Hence, a change in the IOR value of that optical fiber will lead to a shift in the actual central frequencies of the MZ filter towards the frequency of the ITU standards and/or an adjustment of the required channel spacing. A major advantage to this method is that since the tuning is performed after the packaging of the device, the stability of the channel alignment is better preserved.

The present invention introduces a novel and simple method to adjust the MZ filter channels to those of the ITU grid. This is done through inducing an optical path length difference by using a UV light source to create a change in the (IOR) of the fiber arms after the device is packaged. In this invention, the UV light is launched into the MZI filter through one of its input ports in order to achieve the phase adjustment. In this method, since the exposure length is the entire length of one of the arms of the MZI, the required refractive index change is much smaller than the localized UV tuning of the previous methods. This invention allows for a weaker UV source power and shorter treatment times, thus reducing the chances of localized fiber damage. To obtain the desired channel spacing in an MZI filter, the length difference of the fiber arms can be adjusted to the appropriate size to achieve the desired wavelength spacing. In addition, the fiber arms can be made of a photosensitive fiber in order to increase their photo-induced IOR change. The reason for the success of this method is that the UV light can be selectively sent into only one arm of the MZI. The couplers used in MZI have 50:50 coupling ratio at 1550 nm wavelength light source. However, they show negligible coupling ratio at the wavelength of the UV source. Therefore, the method presented in here allows for selective UV tuning of one of the optical length of the arms of the MZ periodic filter.

The change is brought on by the interaction of the Ge-doped silica fiber and the UV radiation. For example, a nitrogen laser ($\lambda$=337 nm) may be used to fine-tune the IOR of the germanium-doped silica fiber. Far more powerful excimer lasers are commonly used for writing Bragg gratings onto optical fiber, as discussed in the U.S. Pat. No. 5,367,588. The radiation from an excimer laser or from the fourth harmonic radiation of an Nd/YAG laser ($\lambda$=266 nm) is very intense and can create a large change in the IOR on the order of $\sim 10^{-3}$. A single-mode silica fiber containing a small percentage of germanium oxide and/or other dopants provides an active medium for the absorption of the UV light. A major advantage of the nitrogen laser versus an excimer laser is its affordability. An excimer laser is an expensive and large piece of specialized equipment that requires extensive maintenance. However, a self-contained nitrogen laser can be bought at roughly one-tenth the price of an excimer laser, is small enough to be portable, and requires little maintenance. In addition, this laser can be utilized in UV curing epoxies for packaging purposes. Another advantage of using a weaker later (e.g. nitrogen laser) is to minimize the high loss induced in the fiber core upon irradiation by the intense UV source. Silica fiber is generally transparent to the UV rays. However, silica fiber tends to change color and darken when exposed to high frequency UV radiation from an ArF Excimer ($\lambda$=193 nm) or KrF Excimer laser ($\lambda$248 nm) even for a short period of time. This problem arises from defects produced within the silica network by the high energy UV radiation. The absorption peak associated with this process is centred at 215 nm, with the band extended to both laser wavelengths at 193 and 248 nm.

As discussed above, the coupling ratio of a 50:50 coupler at the UV wavelength is minimal. Therefore, the UV light travelling through the optical axis of the first input fiber will not be split (coupled) into the other fiber of the coupler. An angled output end or an index matching oil at the output prevents any back reflection of the UV light to insure there is no formation of undesired grating in the fiber. In this invention, a broadband light source or a tunable laser sends its signal down the other input port, while the pass band characteristics of the filter are monitored by an optical spectrum analyzer (OSA) at one of the output ports.

DETAILED DESCRIPTION OF THE INVENTION

Figure 1:
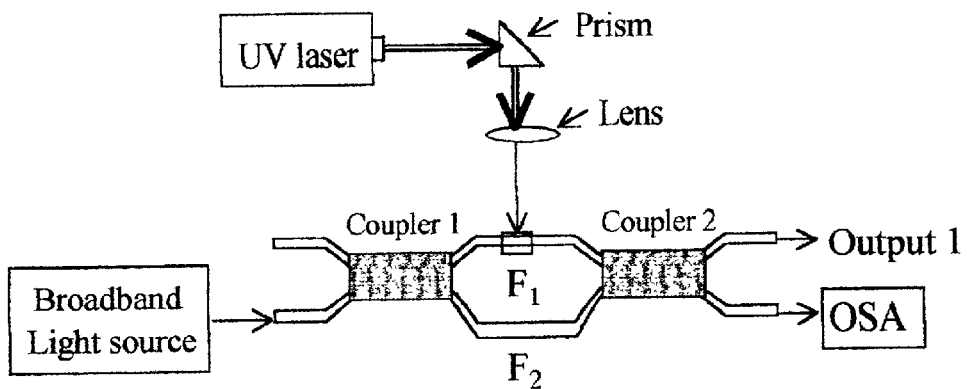
FIG. 1 is a conventional setup for UV irradiation of a surface length of one of the fiber arms of a MZI using a UV laser source (Note that the exposed section is predetermined and masked from other parts of the fiber.
Figure 2:
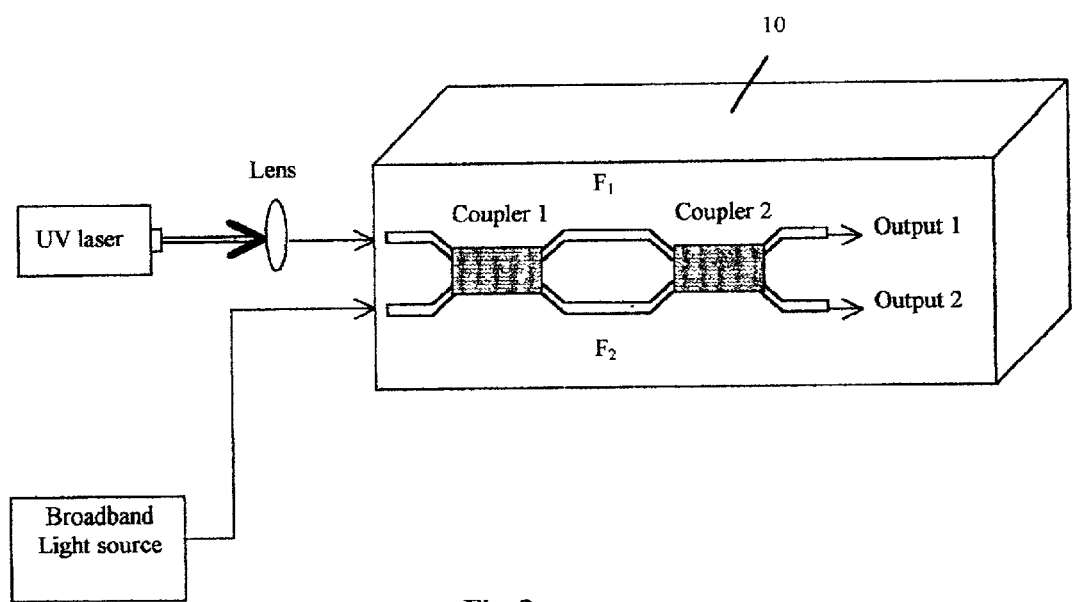
FIG. 2 shows the setup for directing a UV beam of light into the first input of a coupler forming a Mach-Zehnder type interleaver. (The current invention)
Figure 3:
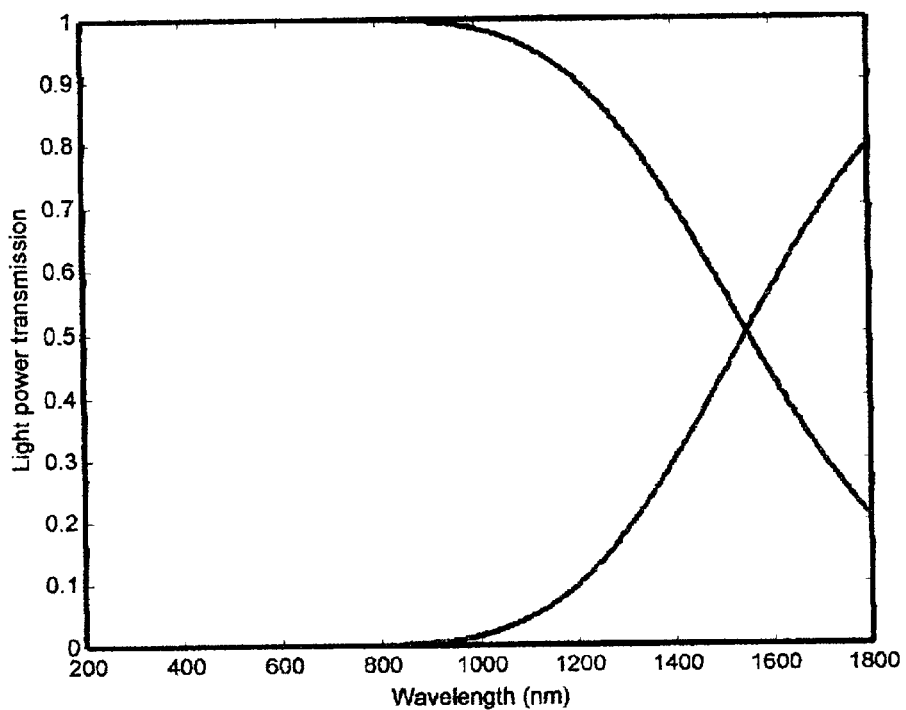
FIG. 3 shows the spectrum of a 3 dB coupler for the UV range up to 1800 nm with $n_{cladding}=1.4447$ and $n_{core} \cong 1.4504$.

FIG. 1 of the drawings shows the prior art method and apparatus for utilizing a UV source to tune an MZI filter. The setup for the UV tuning of an MZI interleaver presented in this invention is shown in FIG. 2. As shown, a UV light source is focused through a lens onto the first filter input, while the second input is illuminated by a broadband light source centred at 1550 nm. The UV light is directed into the first fiber along its optical axis. An optical spectrum analyzer (OSA) is connected to one of the output ports for monitoring the phase shift of the interleaver spectrum. Since the coupling coefficient of a 3 dB coupler at 1550 nm with the UV light is negligible, the UV light is directly launched into one of the input ports of an MZ filter. FIG. 3 exhibits the spectral overlap of the UV light and the infrared region of a 3 dB coupler. As shown in the Figure, there is no coupling at the UV light wavelength, which makes this method feasible for changing the filter frequencies by inducing a change in the IOR of one of the fiber arms of the MZ filter.

Figure 4:
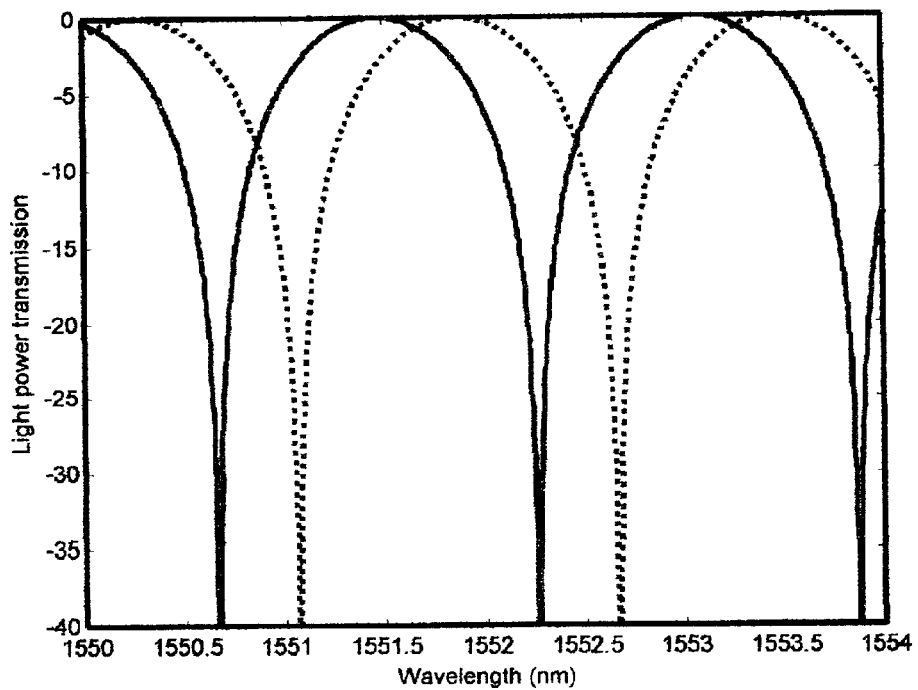
FIG. 4 shows the periodicity of a 100 GHz WDM filter based on a Mach-Zehnder type interleaver before (solid line) and after (dashed line) UV tuning one of two arms with the total length of 10 cm to yield a refractive index change of $\Delta n = 3.876 \times 10^{-6}$.

As these devices are highly sensitive to vibrations, the adjustment of the channels to the ITU wavelength grid is done more effectively after the filter is packaged into a substrate 10 (see FIG. 2) and sealed from all environmental variations. Tuning of the filter before packaging is not very useful since center wavelength can still change due to the local stresses or vibrations or the like on the fiber during the packaging process. The maximum phase shift required depends on the periodicity of wavelength response of the device as determined by the difference in the optical path length of the two fiber arms interconnecting the two couplers. To align the central wavelengths to ITU wavelengths, one needs to create a phase shift of no more than 45 degrees. The corresponding required change in the index of refraction of one of the fiber arms of an MZI with a total arm length of, for instance 10 cm, is calculated by the following equation $$\Delta n = \frac{\lambda}{4L} = \frac{1550}{4 \times 10 \times 10^{-7}} = 3.876 \times 10^{-6}$$

where X is the center wavelength, n is the effective index of the optical fiber and L is the geometric length of the treated arm. The small change in the refractive index (~$10^{-6}$) needed to match the filter spectrum to that of the ITU grids can easily be achieved using a longer wavelength and weaker laser, A longer wavelength of the UV source produces little change in the core as a weaker absorption band of the Ge-doped silica fiber is affected. A permanent change in the refractive index is induced in the core region, in effect creating a phase shift towards the corresponding ITU grid. FIG. 4 illustrates the spectrum of a 100 GHz MZ filter before (solid line) and after (dashed line) the UV radiation where a change of $\Delta n = 3.876 \times 10^{-6}$ in the IOR value of one of the filter arms has been created.

This method can also be used to design the channel spacing of an MZ filter by creating a large change in its IOR (>>$10^{-6}$) leading to large optical path length difference between the two arms. By increasing the total length of fiber arms, the required UV induced refractive index change is increased, as is the difference in optical path length between the two arms. This method can also eliminate the need for specialty photosensitive fibers or $H_2$ loaded silica fibers.

In conclusion, in this invention, the minimal coupling ratio of a 50:50 coupler with the UV light is recognized to make a permanent change in the IOR of one of the optical arms of an asymmetric MZ interleaver. The light induced refractive index change in that arm affects the spectrum of the MZ filter. Consequently, a desired spectrum of the MZ interleaver can be achieved, which agrees with the ITU grids. In addition, the optical path lengths can slightly change to obtain the desired channel spacing of the MZ filter. The present invention offers a simple method for fine-tuning a MZ filter without the need for a complex and costly laser setup. Since the tuning is performed after the packaging of the device, the stability of the channel alignment is better preserved, Another advantage of the current invention is that the UV exposure is controlled with more accuracy until a desired frequency shift towards the nominal ITU grids are achieved. The required UV power and duration of exposure is also reduced in this method.

What is claimed is:

1. A method for tuning a Mach-Zehnder Interferometer (MZI) having two optical fiber arms, the method comprising:

launching an ultraviolet laser emission into an MZI input port and along one of the two optical fiber arms to permanently adjust the refractive index (RI) of the one of the two optical fiber arms; and monitoring an output light signal of the MZI to determine when a desired passband characteristic has been achieved.

2. An apparatus for tuning a Mach-Zehnder Interferometer (MZI), the MZI having two optical fiber arms and a 50:50 coupler, the apparatus comprising:

means for launching an ultra-violet (UV) laser emission into an input port of said MZI and along one of the two optical fibers;

means for launching a light signal into another input port of said MZI; and optical spectrum analyzer (OSA) means for monitoring the light signal at an output port of said MZI to determine when a desired passband characteristic has been achieved.

3. A method according to claim 1, wherein the ultraviolet laser emission is launched from a nitrogen laser.

4. A method according to claim 1 wherein the desired passband characteristic comprises an ITU (International Telecommunications Union) channel spacing such that the MZI after tuning functions as a MZI interleaver with ITU channel spacing.

5. An apparatus according to claim 2, wherein the means for launching a UV laser emission comprises a nitrogen laser.

6. An apparatus according to claim 2, further comprising an angled output end on the one of the optical fibers.

7. An apparatus according to claim 2 adapted to tune the MZI to function as an MZI interleaver with ITU (International Telecommunications Union) channel spacings.

* * * * *